(12) United States Patent
Liu et al.

(10) Patent No.: US 8,090,709 B2
(45) Date of Patent: Jan. 3, 2012

(54) REPRESENTING QUERIES AND DETERMINING SIMILARITY BASED ON AN ARIMA MODEL

(75) Inventors: Ning Liu, Beijing (CN); Jun Yan, Beijing (CN); Benyu Zhang, Beijing (CN); Zheng Chen, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 468 days.

(21) Appl. No.: 11/770,307

(22) Filed: Jun. 28, 2007

(65) Prior Publication Data
US 2009/0006326 A1    Jan. 1, 2009

(51) Int. Cl.
 *G06F 17/30* (2006.01)
(52) U.S. Cl. ....................................................... 707/713
(58) Field of Classification Search .................. None
See application file for complete search history.

(56) References Cited

U.S. PATENT DOCUMENTS

| | | | |
|---|---|---|---|
| 4,837,705 A | 6/1989 | Mussler et al. | |
| 5,544,049 A | 8/1996 | Henderson et al. | |
| 5,603,024 A | 2/1997 | Goldring | |
| 5,734,893 A | 3/1998 | Li et al. | |
| 5,884,037 A * | 3/1999 | Aras et al. | 709/226 |
| 5,940,825 A | 8/1999 | Castelli et al. | |
| 6,006,225 A | 12/1999 | Bowman et al. | |
| 6,411,950 B1 | 6/2002 | Moricz et al. | |
| 6,421,675 B1 | 7/2002 | Ryan et al. | |
| 6,446,060 B1 | 9/2002 | Bergman et al. | |
| 6,473,753 B1 | 10/2002 | Katariya et al. | |
| 6,496,817 B1 | 12/2002 | Whang et al. | |
| 6,606,417 B1 | 8/2003 | Brechner | |
| 6,650,998 B1 | 11/2003 | Rutledge et al. | |
| 6,732,088 B1 | 5/2004 | Glance | |
| 6,745,178 B1 | 6/2004 | Emens et al. | |
| 6,778,981 B2 | 8/2004 | Lee et al. | |
| 6,785,672 B1 | 8/2004 | Floratos et al. | |
| 6,832,218 B1 | 12/2004 | Emens et al. | |
| 7,016,892 B1 | 3/2006 | Kokkonen et al. | |
| 7,051,023 B2 | 5/2006 | Kapur et al. | |
| 7,082,428 B1 | 7/2006 | Denny et al. | |
| 7,149,732 B2 | 12/2006 | Wen et al. | |
| 7,158,966 B2 | 1/2007 | Brill et al. | |
| 7,577,646 B2 * | 8/2009 | Chien et al. | 707/4 |
| 2002/0184212 A1 | 12/2002 | Ugai et al. | |
| 2004/0172240 A1 | 9/2004 | Crockett et al. | |

(Continued)

OTHER PUBLICATIONS

Chien et al. "Semantic Similarity Between Search Engine Queries Using Temporal Correlation" International World Wide Web Conference Committee (W3C2) WWW 2005, May 10-14, 2005, Chiba, Japan, ACM.*

(Continued)

*Primary Examiner* — Fred I Ehichioya
*Assistant Examiner* — Berhanu Mitiku
(74) *Attorney, Agent, or Firm* — Perkins Coie LLP (57) ABSTRACT

Representing queries and determining similarity of queries based on an autoregressive integrated moving average ("ARIMA") model is provided. A query analysis system represents each query by its ARIMA coefficients. The query analysis system may estimate the frequency information for a desired past or future interval based on frequency information for some initial intervals. The query analysis system may also determine the similarity of a pair of queries based on the similarity of their ARIMA coefficients. The query analysis system may use various metrics, such as a correlation metric, to determine the similarity of the ARIMA coefficients.

13 Claims, 5 Drawing Sheets

U.S. PATENT DOCUMENTS

| | | |
|---|---|---|
| 2004/0193612 A1 | 9/2004 | Chang |
| 2004/0230105 A1 | 11/2004 | Geva et al. |
| 2005/0050033 A1 | 3/2005 | Thomas et al. |
| 2005/0102259 A1 | 5/2005 | Kapur |
| 2005/0144065 A1 | 6/2005 | Calabria et al. |
| 2005/0198068 A1 | 9/2005 | Mukherjee et al. |
| 2005/0234877 A1 | 10/2005 | Yu |
| 2006/0117003 A1 | 6/2006 | Ortega et al. |
| 2006/0136370 A1 | 6/2006 | Buckler |
| 2006/0224356 A1 | 10/2006 | Castelli et al. |
| 2006/0248068 A1 | 11/2006 | Chien et al. |
| 2006/0257018 A1 | 11/2006 | Shi et al. |
| 2006/0293950 A1 | 12/2006 | Meek et al. |
| 2007/0043706 A1 | 2/2007 | Burke et al. |
| 2007/0067267 A1 | 3/2007 | Ives |
| 2007/0067283 A1 | 3/2007 | Sengupta |
| 2007/0094219 A1 | 4/2007 | Kipersztok |
| 2007/0097755 A1 | 5/2007 | Marndi et al. |
| 2007/0112764 A1 | 5/2007 | Yih et al. |
| 2007/0121674 A1 | 5/2007 | Chen et al. |
| 2007/0143278 A1 | 6/2007 | Srivastava et al. |
| 2007/0143300 A1 | 6/2007 | Gulli et al. |
| 2007/0203894 A1 | 8/2007 | Jones et al. |
| 2008/0133503 A1 | 6/2008 | Popescul et al. |
| 2008/0144124 A1 | 6/2008 | Samadani et al. |
| 2008/0154877 A1* | 6/2008 | Joshi et al. .................. 707/5 |
| 2008/0183685 A1 | 7/2008 | He et al. |
| 2009/0006002 A1 | 1/2009 | Honisch et al. |
| 2009/0024612 A1* | 1/2009 | Tang et al. .................. 707/5 |
| 2009/0049029 A1 | 2/2009 | Choi et al. |

OTHER PUBLICATIONS

Li et al. "Similarity of Temporal Query Logs Based on ARIMA Model" Six IEEE International Conference on Data Mining—Workshops (ICDMW'06).*

Li et al. "Similarity of Temporal Query Logs Based on ARIMA Model" Six IEEE Internationl Conference on Data Mining Workshops (CDMW'06) Proceedings of the Sixth International Conference on Data Mining (ICDM'06) 2006 IEEE.*

U.S. Appl. No. 11/770,505, filed Jun. 28, 2007, Liu et al.
U.S. Appl. No. 11/770,462, filed Jun. 28, 2007, Liu et al.
U.S. Appl. No. 11/770,445, filed Jun. 28, 2007, Liu et al.
U.S. Appl. No. 11/770,423, filed Jun. 28, 2007, Liu et al.
U.S. Appl. No. 11/770,385, filed Jun. 28, 2007, Liu et al.
U.S. Appl. No. 11/770,358, filed Jun. 28, 2007, Liu et al.

"Search-Query Trend Analysis with Internal- and External- Correlation", *Conference '04*. Copyright 2004 ACM 1-58113-000-0/00/0004.

Abfalg, et al. "Similarity Search on Time Series Based on Threshold Queries", EDBT 2006, LNCS 3896, pp. 276-294, 2006. Copyright Springer-Verlag Berlin Heidelberg 2006.

Baza-Yates, et al. "Query Recommendation using Query Logs in Search Engines", *Workshop in Web Clustering*, Greece, 2004. Current Trends in Database Technology—EDBT 2004 Workshops, LNCS 3268, Springer.

Capobianco, Enrico. "Multiscale Analysis of Stock Index Return Volatility", *Computational Economics*, Apr. 2004 vol. 23, Issue 3, pp. 219-237.

Caraca-Valente, et al. "Discovering Similar Patterns in Time Series", *KDD 2000*, Boston, MA, Copyright ACM 2000 (9 pages).

Chien, et al. "Semantic Similarity Between Search Engine Queries Using Temporal Correlation", *Proceedings of the 14th International Conference on the World Wide Web*, May 10-14, 2005, Chiba, Japan, pp. 2-11.

Ghysels, Eric. "Time-series model with periodic stochastic regime switching", *Macroeconomic Dynamics* (2000), 4: pp. 467-486.

Granger. "Investigating Casual Relations by Econometric Models and Cross-spectral Methods", *Econometrics*, vol. 27, No. 3, pp. 424-438, Aug. 1969.

Guralnik, et al. "Event Detection from Time Series Data", Presented at *Proceedings of the Fifth International Conference on Knowledge Discovery and Data Mining (KDD)*, San Diego, California, USA, pp. 33-42, 1999.

Joachims. "Optimizing Search Engines using Clickthrough Data", *SIGKDD 02*, Edmonton, Alberta, Canada. Copyright 2002 ACM 1-5811-567-X/02/0007.

Keogh, et al. "Dimensionality Reduction for Fast Similarity Search in Large Time Series Databases", KAIS Long paper submitted May 16, 2000. 3 (3). 263-286.

Keogh, et al. "Finding Surprising Patterns in a Time Series Database in Linear Time and Space", *Proceedings SIGKDD 2002*, Jul. 23-26 2002, Edmonton, Alberta, Canada, pp. 550-556.

Lau, et al. "Patterns of Search: Analyzing and Modeling Web Query Refinement", *Proceedings of the Seventh International Conference on User Modeling*, Banff, Canada, pp. 119-128. Year of Publication: 1999/ ISBN:3-211-83151-7.

Liu, et al. "Semantic Overall and Partial Similarity of Temporal Query Logs", *2006 IEEE International Conference on Data Mining*, Dec. 18-22, 2006, Hong Kong. Microsoft Research Asia, Beijing.

Pratt. "Locating Patterns in Discrete Time-Series," May 2001.

Sims. "Money, Income, and Causality", *The American Economic Review*, vol. 62, No. 4, pp. 540-552, Sep. 1972.

Sun, et al. "Casual Relation of Queries from Temporal Logs", *WWW 2007*, May 8-12, 2007, Banff, Alberta, Canada. ACM 978-1-59593-654-7/07/0005.

Vlachos, et al. "Fast Burst Correlation of Financial Data", *Presented at 9th European Conference of Practices in Knowledge and Data Discovery (PKDD)*, Porto, Portugal, pp. 268-379, 2005.

Vlachos, et al. "Identifying Similarities, Periodicities and Bursts for Online Search Queries", *SIGMOD 2004*, Jun. 13-18, 2004, Paris, France. (12 pages).

Wen, et al. "Query Clustering Using User Logs", *ACM Transactions on Information Systems (TOIS)*, vol. 20, No. 1, Jan. 2002, pp. 59-81.

Wen-tau, et al. "Finding Advertising Keywords on Web Pages", *Proceedings of the 15th International Conference on World Wide Web (WWW 2006)*, May 23-26, 2006, Edinburgh, Scotland, 10 pages.

Zaiane, et al. "Finding Similar Queries to Satisfy Searches Based on Query Traces", *OOIS Workshops 2002*, pp. 207-216.

"AFL Draws," University of Melbourne Statistical Consulting Centre. last modified: 2005. Available at www.scc.ms.unimelb.edu.au/whatisstatistics/afldraws.html [last accessed Jun. 8, 2009].

"Multiple Regression," by StatSoft, Inc. Available at http://www.statsoft.com/textbook/stmulreg.html. Retrieved from the Wayback Machine at http://web.archive.org.web/20050101-20050201re_/http://www.statsoft.com/textbook/stmulreg.html [last retrieved on Jun. 10, 2009].

Chatfield, Christopher, "The Analysis of Time Series," Boca Raton, 6th ed., 2004, pp. 107-109, 111, 112. Avaliable at http://books.google.com. [last accessed Jun. 4, 2009].

Groschwitz and Polyzos, "A Time Series Model of Long-Term NSFNET Backbone Traffic," In: Proceedings of the IEEE Int'l Conference on Communication (1994). Available at http://citeseerx, ist.psu.edu/viewdoc/summary?doi=10.1.1.45.7322 [last accessed Jun. 18, 2009].

Kage and Sumiya, "A Web Search Method Based on the Temporal Relation of Query Keywords," WISE 2006 (2006). Available at Springer-Link.

Sang and Li, "A Predictability Analysis of Network Traffic," In: Proceedings of IEEE INFOCOM.2000. Available at http://citeseerx.ist.psu.edu/viewdocs/summary?doi=10.1.1.41.4537 [last accessed Jun. 18, 2009].

Yamauchi and Mukaidono, "Probabilistic Inference and Bayseian Theorem based on Logical Implication," 1999. Available at Springer-Link.

Zhao et al., "Time-Dependent Semantic Similarity Measure of Queries Using Historical Click-Through Data," In: WWW 2006, Edinburgh, Scotland 2006. Available at ACM.

Zushi et al., "A Vector space Retrieval Method with Causal Relationship Computation Functions for Event Data," In: Proceedings for the 2005 Symposium on Applications and the Internet Workshops (2005). Available at IEEE.

Xia, Yuni et al., "Indexing and Querying Constantly Evolving Data Using Time Series Analysis," 2005 (12 pages).

Liu, Ning, et al., "Similarity of Temporal Query Logs Based on ARIMA Model," Proceedings of the Sixth International Conference on Data Mining (ICDM '06), Copyright 2006 (5 pages).

Schwartz and Mattern, "Detecting Causal Relationships in Distributed Computations: in Search of the Holy Grail," In: Distributed Computing, vol. 7, pp. 149-174 (1994). Available at Springerlink.

Beitzel et al., "Temporal Analysis of a Very Large Topically Categorized Web Query Log," Nov. 22, 2006, Wiley InterScience, vol. 58, issue 2, pp. 166-178, http://www3.interscience.wiley.com/journal.

* cited by examiner

REPRESENTING QUERIES AND DETERMINING SIMILARITY BASED ON AN ARIMA MODEL

BACKGROUND

Many search engine services, such as Google and Yahoo, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure.

Search engine services obtain revenue by placing advertisements along with search results. These paid-for advertisements are commonly referred to as "sponsored links," "sponsored matches," or "paid-for search results." An advertiser who wants to place an advertisement (e.g., a link to their web page) along with certain search results provides a search engine service with an advertisement and one or more bid terms. When a search request is received, the search engine service identifies the advertisements whose bid terms match the terms of the search request. The search engine service then selects advertisements to display based on the closeness of their match, the amount of money that the advertisers are willing to pay for placing the advertisement, and other factors. The search engine service then adds a sponsored link to the search result that points to a web page of the advertiser. The search engine services typically either charge for placement of each advertisement along with search results (i.e., cost per impression) or charge only when a user actually selects a link associated with an advertisement (i.e., cost per click).

Advertisers would like to maximize the effectiveness of their advertising dollars used to pay for advertisements. Thus, advertisers try to identify bid term, advertisement, and bid amount combinations that result in the highest benefits (e.g., most profit) to the advertiser. Advertisers may analyze query trends to identify bid terms, timing for placing advertisements based on those bid terms, bid amounts for those bid terms, and so on. Query trend analysis studies how the frequency of queries changes over time so that future frequency of queries can be predicted. If query trends can be accurately predicted, then advertisers can adjust their placement of advertisements in an attempt to maximize the advertising effectiveness. For example, if the frequency of a query is likely to increase in the near future, an advertiser may want to increase the bid amount for terms of that query. It has been, however, difficult to accurately model the frequency of queries and thus difficult to accurately predict the frequency of queries.

Because of the popularity of search engine services, the query logs generated by search engine services tend to be very large. A query log may include millions of entries, each of which identifies a query that was submitted by a searcher and a time of submission. Because of their size, the query logs consume vast amounts of storage. To reduce their storage requirements, the query logs are often compressed into query frequency information by storing, for each query and for each interval (e.g., a day), the frequency (i.e., count of submissions) of that query for that interval, rather an entry for each individual query submission. Nevertheless, because millions of different queries can be submitted by searchers, even the query frequency information consumes large amounts of storage.

SUMMARY

Representing queries and determining similarity of queries based on an autoregressive integrated moving average ("ARIMA") model is provided by a query analysis system. The query analysis system represents each query by its ARIMA coefficients. The query analysis system may estimate the frequency information for a desired past or future interval based on frequency information for some initial intervals. To estimate the frequency, the query analysis system applies the ARIMA model to the initial intervals to generate the frequency of the next interval. The query analysis system can then repeat the process for each subsequent interval using the newly generated frequency information until the frequency of the desired interval is estimated. The query analysis system may also determine the similarity of a pair of queries based on the similarity of their ARIMA coefficients. The query analysis system may use various metrics, such as a correlation metric, to determine the similarity of the ARIMA coefficients.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Representing queries and determining similarity of queries based on an autoregressive integrated moving average ("ARIMA") model is provided by a query analysis system. An ARIMA model represents a time series using autoregressive terms, integration terms, and moving average terms. The autoregressive terms represent the importance of past values of a time series to the current value. The integration terms represent differences between values with their trend and drift removed. The moving average terms represent a moving average of the values with random noise removed. The ARIMA model may be represented as follows:

$$ARIMA(p,d,q) \quad (1)$$

where p represents the number of autoregressive terms, d represents the number of integration terms, and q represents the number of moving average terms. The number of these terms represents the order of the ARIMA model. An ARIMA (1, 1, 1) model with an order of p, d, and q each equal to 1 may be represented as follows:

$$X_t = \mu + X_{t-1} + \phi(X_{t-1} - X_{t-2}) - \beta \epsilon_{t-1} \quad (2)$$

where $X_t$ represents the estimated value at time or interval t, $\mu$, $\phi$, and $\beta$ represent the ARIMA coefficients, and $\epsilon_{t-1}$ represents background noise with a mean of zero and a certain variance. ARIMA model with an order of (X,0,0), where X is greater than zero, represents an auto regressive ("AR") model, and an ARIMA model with an order of (0,0,X) represents a moving average ("MA") model.

In some embodiments, the query analysis system represents each query by its ARIMA coefficients. To generate the ARIMA coefficients, the query analysis system may use an Akaike Information Criterion ("AIC") to determine the order of the ARIMA model for the query. (See Box, G. and Jenkins, G. M., "Time Series Analysis: Forecasting and Control," Prentice Hall, 1994.) Alternatively, the query analysis system may use a fixed order of the ARIMA model (e.g., (1, 1, 1)) for each query or may use a fixed order for some of the terms and a variable order for other terms. The query analysis system then uses a least squares method to determine the ARIMA coefficients for the query. (See Box, G. and Jenkins, G. M., "Time Series Analysis: Forecasting and Control," Prentice Hall, 1994.) Thus, the ARIMA coefficients of a query represent a compressed form of the query with a reduced dimensionality that is based on the order of the ARIMA model for the query. By representing each query by its ARIMA coefficients, the query analysis system reduces the amount of storage needed to store information describing the frequencies of the queries.

In some embodiments, the query analysis system regenerates the frequency information for a desired interval based on frequency information for some initial intervals. The query analysis system applies the ARIMA model to the initial intervals to generate the frequency of the next interval. The query analysis system can then repeat the process for each subsequent interval using the newly generated frequency information until the frequency of the desired interval is regenerated. For example, for an ARIMA (1, 1, 1) model, the query analysis system would start out with the frequencies of intervals 1 and 2 and then calculate the frequency for interval 3 using Equation 2. The query analysis system would then calculate the frequency for interval 4 using the frequencies of intervals 2 and 3. The query analysis system may also store with the ARIMA coefficients the frequencies for periodic intervals such as the frequency for the first two days of each month. The query analysis system could then quickly regenerate the frequency for a given interval by starting with the closest stored frequency information. The query analysis system can also continue the process of regenerating, or actually generating, for intervals in the future for predicting or forecasting the frequencies. For example, the query analysis system may start out with frequency information for some recent intervals and then, using Equation 2, predict frequencies for intervals in the future.

In some embodiments, the query analysis system determines the similarity of a pair of queries based on the similarity of their ARIMA coefficients. The query analysis system may use various metrics to determine the similarity of the ARIMA coefficients. For example, the query analysis system may use a correlation metric, a Euclidean distance metric, a cosine similarity metric, and so on. The similarity between pairs of queries can be represented by similarity scores. The similarity scores can then be used to analyze query trends of similar queries, which may be helpful in determining the timing of advertisement placements, selecting of keywords for advertisements, determining bid amounts, and so on.

In some embodiments, the query analysis system may represent the ARIMA coefficients of queries p and q as a vector as follows:

$$X_p^{ARIMA} = (X_{p,1}^A, \ldots, X_{p,n_p}^A)$$

$$X_q^{ARIMA} = (X_{q,1}^A, \ldots, X_{q,n_q}^A) \quad (3)$$

where $n_p$ and $n_q$ represent the number of ARIMA coefficients or dimensions of the vector for queries p and q, respectively. When determining the similarity of a pair of queries, the query analysis system may normalize the dimensions of the vectors by adding coefficients with a value of zero to the shorter vector. Thus, the normalized vectors may be represented as follows:

$$X_p^{ARIMA} = (X_{p,1}^A, \ldots, X_{p,n}^A)$$

$$X_q^{ARIMA} = (X_{q,1}^A, \ldots, X_{q,n}^A) \quad (4)$$

where n represents the maximum of $n_p$ and $n_q$. The query analysis system may normalize the numbers of p, d, and q coefficients of the queries independently. Thus, if one query has two p coefficients and the other query has only one p coefficient, then the query analysis system adds another p coefficient with a zero value to the vector for the other query. The query analysis system may represent the similarity between a pair of vectors and thus a pair of queries based on a correlation metric as represented by the following:

$$\frac{1}{n} \sum_i \left( \frac{X_{p,i}^A - \mu(X_p^A)}{\sigma(X_p^A)} \right) \left( \frac{X_{q,i}^A - \mu(X_q^A)}{\sigma(X_q^A)} \right) \quad (5)$$

where $\mu(X_p^A)$ represents the mean of the coefficients for query p and $\sigma(X_p^A)$ represents the standard deviation of the coefficients for query p. The value calculated using Equation 5 represents a similarity score indicating the similarity between queries p and q. Such a similarity score ranges between −1 and 1 with a similarity score for a query and itself being 1. One skilled in the art will appreciate that many different variations of determining the correlation of two series of variables may be used to generate a similarity score of a pair of queries.

Figure 1:
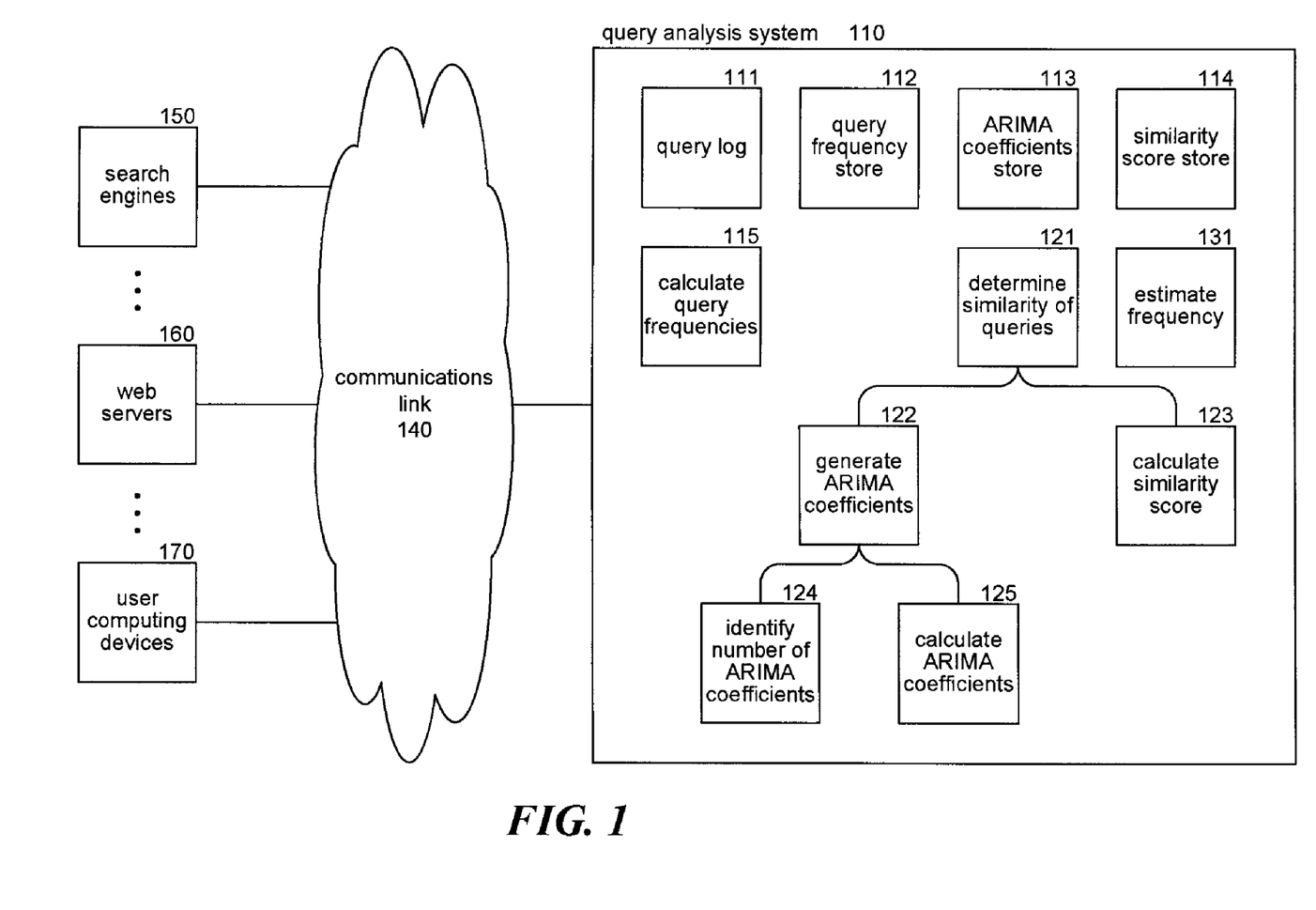
FIG. 1 is a block diagram that illustrates components of a query analysis system in some embodiments.

FIG. 1 is a block diagram that illustrates components of a query analysis system in some embodiments. The query analysis system 110 may be connected to search engine servers 150, web servers 160, and user computing devices 170 via a communications link 140. The search engine servers generate query logs based on queries submitted by users using the user computing devices. The search engine servers provide to the user computing device search results that include links to web pages of the web servers. The query analysis system may include a query log 111, a query frequency store 112, an ARIMA coefficients store 113, a similarity score store 114, and a calculate query frequencies component 115. The query log contains query logs received from the various search engine servers. The calculate query frequencies component counts the number of query submissions for each query for each interval and stores the information in the query frequency store. The query frequency store has an entry for each query identified in the query log. Each entry contains a subentry for each interval containing the frequency of the submissions of that query during the interval. The ARIMA coefficients store contains an entry for each query along with its ARIMA coefficients and some initial frequencies for regenerating the frequencies. The similarity score store contains an entry for each pair of queries with a similarity score for that pair of queries.

The query analysis system also includes a determine similarity of queries component 121 and an estimate frequency component 131. The determine similarity of queries component generates the ARIMA coefficients for the queries and calculates a similarity score for each pair of queries. The determine similarity of queries component invokes a generate ARIMA coefficients component 122 for each query and a calculate similarity score component 123 for each pair of queries. The generate ARIMA coefficients component invokes an identify number of ARIMA coefficients component 124 and a calculate ARIMA coefficients component 125 to generate the ARIMA coefficients for a query. The identify number of ARIMA coefficients component may use an AIC algorithm to determine the order of the ARIMA model for a query. The calculate ARIMA coefficients component calculates the ARIMA coefficients for an ARIMA model of that order using a least squares method. The calculate similarity score component calculates the similarity score for a pair of queries based on a correlation between the ARIMA coefficients of the queries. The estimate frequency component uses the ARIMA coefficients to estimate (e.g., regenerate or predict) frequencies for a query.

The computing device on which the query analysis system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the query analysis system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in and used with various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The query analysis system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. In addition, the functions of the query analysis may be performed offline. For example, the query analysis system may generate new ARIMA coefficients for the queries on a periodic basis. Also, the generating of the ARIMA coefficients and the determining of similarity may be performed by computing devices separate from computing devices that use the ARIMA coefficients to estimate frequencies.

Figure 2:
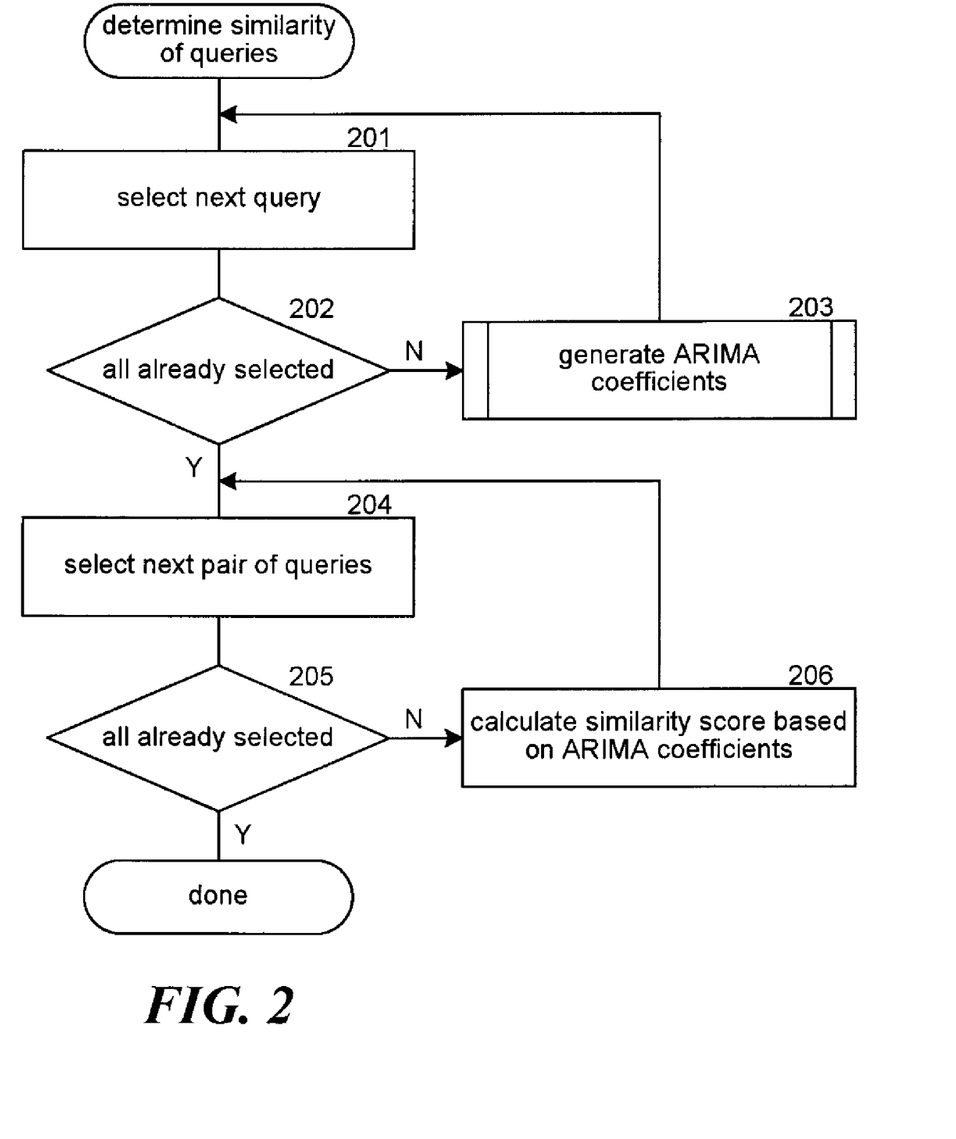
FIG. 2 is a flow diagram that illustrates high-level processing of a determine similarity of queries component of the query analysis system in some embodiments.

FIG. 2 is a flow diagram that illustrates high-level processing of the determine similarity of queries component of the query analysis system in some embodiments. The component generates ARIMA coefficients for each query and then calculates a similarity score for each pair of queries. In block 201, the component selects the next query. In decision block 202, if all the queries have already been selected, then the component continues at block 204, else the component continues at block 203. In block 203, the component invokes the generate ARIMA coefficients component to determine the number of ARIMA coefficients and calculate the ARIMA coefficients for the selected query. The component then loops to block 201 to select the next query. In block 204, the component selects the next pair of queries. In decision block 205, if all the pairs of queries have already been selected, then the component completes, else the component continues at block 206. In block 206, the component calculates a similarity score based on the ARIMA coefficients for the selected pair of queries. The component then loops to block 204 to select the next pair of queries.

Figure 3:
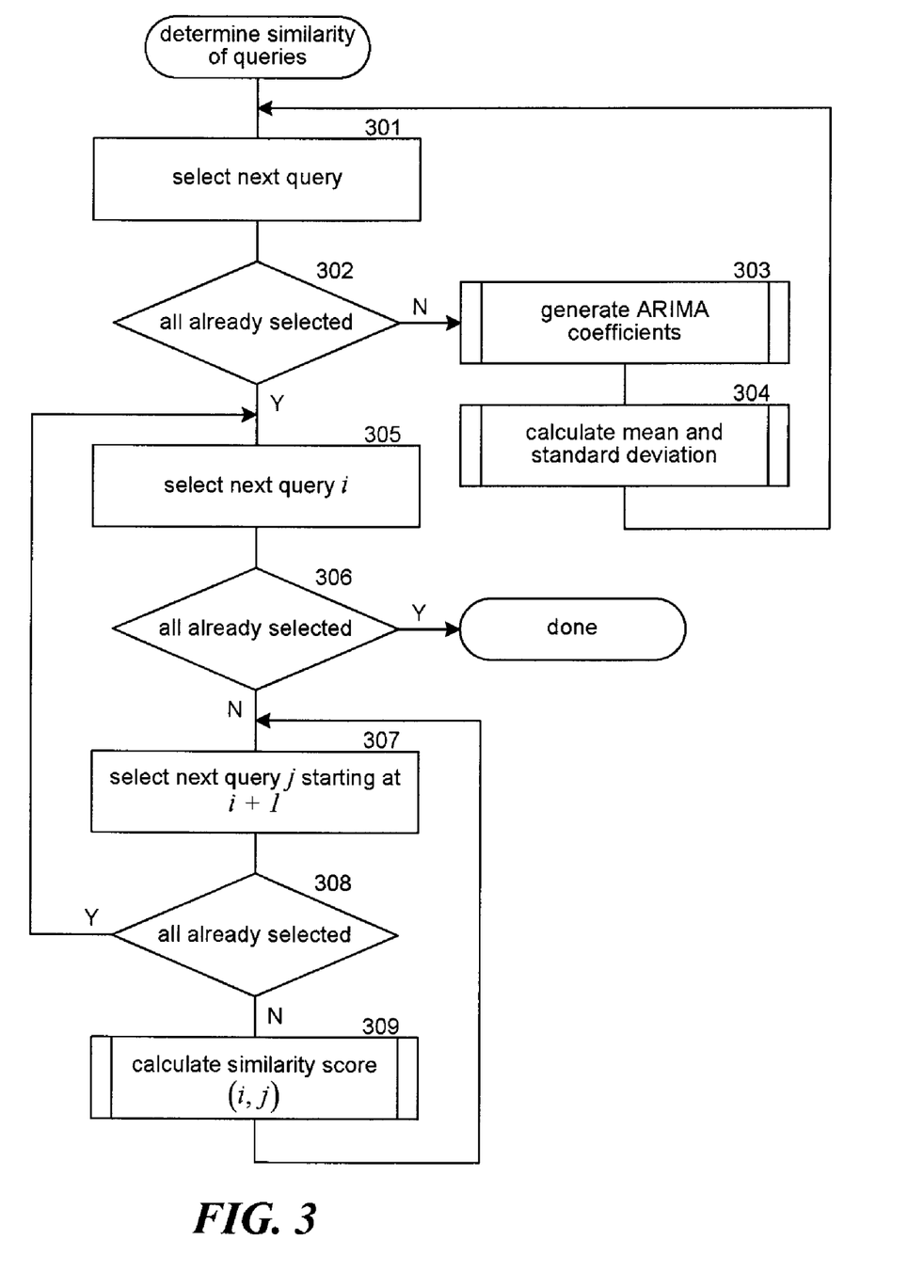
FIG. 3 is a flow diagram that illustrates low-level processing of a determine similarity of queries component of the query analysis system in some embodiments.

FIG. 3 is a flow diagram that illustrates low-level processing of the determine similarity of queries component of the query analysis system in some embodiments. The component generates ARIMA coefficients for each query and then calculates a similarity score for each pair of queries. In blocks 301-304, the component loops generating the ARIMA coefficients for each query and calculating the mean and the standard deviation of the ARIMA coefficients for each query. In block 301, the component selects the next query. In decision block 302, if all the queries have already been selected, then the component continues at block 305, else the component continues at block 303. In block 303, the component invokes the generate ARIMA coefficients component to determine the number of ARIMA coefficients and calculate that number of ARIMA coefficients. In block 304, the component calculates the mean and the standard deviation of the ARIMA coefficients for the selected query for use in calculating the similarity scores. The component then loops to block 301 to select the next query. In blocks 305-309, the component loops generating a similarity score for each pair of queries. In block 305, the component selects the next query. In decision block 306, if all the queries have already been selected, then the component completes, else the component continues at block 307. In blocks 307-309, the component loops selecting each other query for which the similarity score of the selected query and the other query has not yet been calculated. In block 307, the component selects the next other query. In decision block 308, if all such other queries have already been selected, then the component loops to block 305 to select the next query, else the component continues at block 309. In block 309, the component invokes the calculate similarity score component passing an indication of the selected query and the selected other query to calculate the similarity score for the queries. The component then loops to block 307 to select the next other query.

Figure 4:
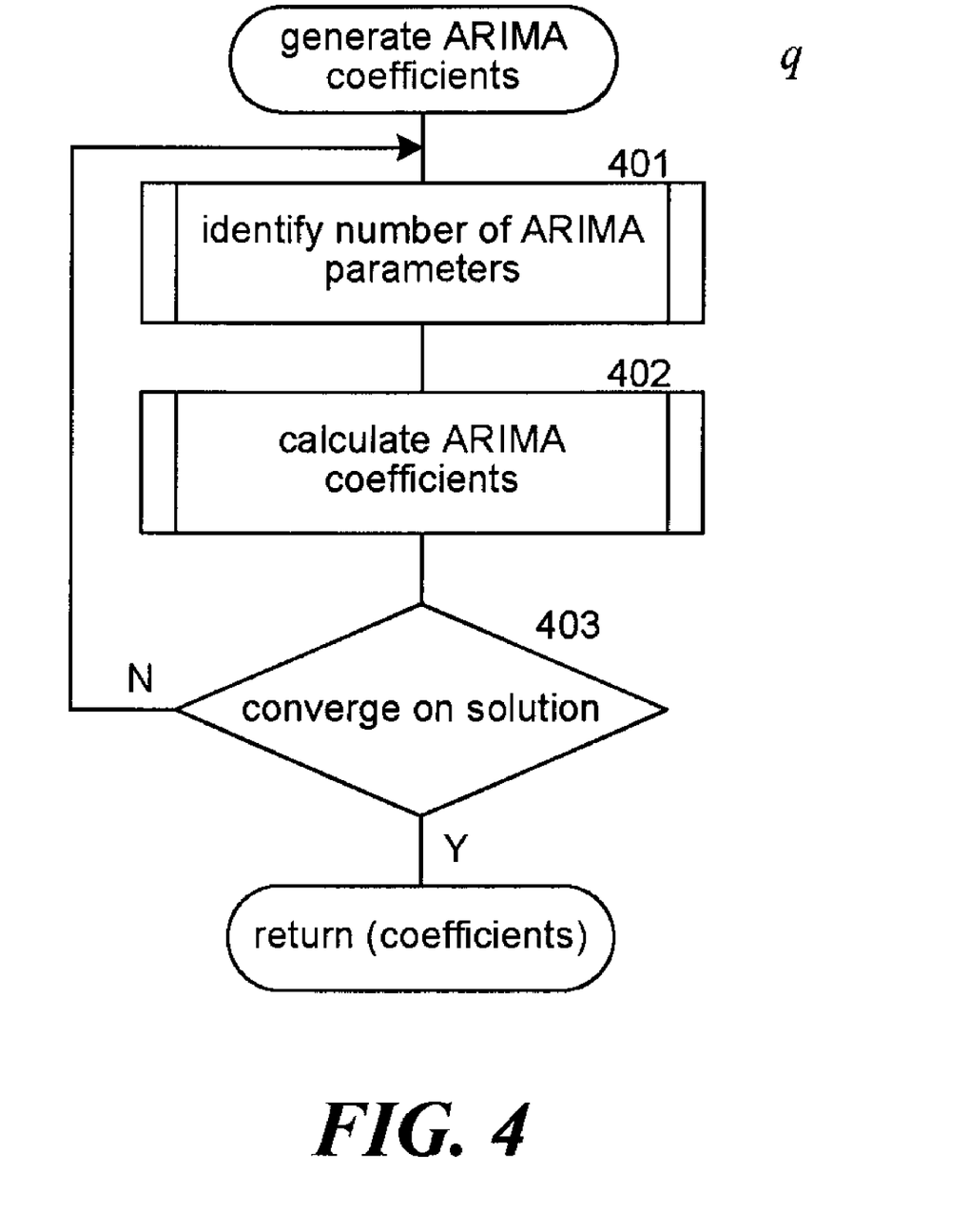
FIG. 4 is a flow diagram that illustrates the processing of a generate ARIMA coefficients component of the query analysis system in some embodiments.

FIG. 4 is a flow diagram that illustrates the processing of the generate ARIMA coefficients component of the query analysis system in some embodiments. The component is passed a query and determines the numbers of ARIMA coefficients and calculates the value of the ARIMA coefficients. The component may use an AIC algorithm to determine the numbers of coefficients p, d, and q for ARIMA (p, d, q) and their values by minimizing the following objective function:

$$AIC = 2k + n \ln(RSS/n) \qquad (6)$$

where AIC represents the value to be minimized, k represents the number of coefficients, n represents the number of intervals of the query, RSS represents the residual sum of squares, and k may be equal to the sum of p, d, and q. The component may successively select combinations of numbers for p, d, and q and then use a least squares algorithm to select values for the coefficients with that number of coefficients. The least squares algorithm selects values that minimize a sum of the squares of the differences between each actual frequency and the estimated frequency using the selected numbers of coefficients. In blocks 401-403, the component loops selecting different combinations of numbers of coefficients and calculating their values until a solution is found that tends to minimize the AIC value. In block 401, the component selects the next combination of numbers for p, d, and q. The component may use a comprehensive approach by selecting each possible combination of p, d, and q up to a maximum number for each of p, d, and q. Alternatively, the component may attempt to select the next combination based on expected convergence on a solution. In block 402, the component calculates values for the selected numbers of ARIMA coefficients using a least squares method. One skilled in the art will appreciate that many well-known optimization techniques such as linear regression, gradient descent, and so on can be used to determine the number and value of the coefficients. In decision block 402, if the numbers of coefficients have converged on a solution (e.g., the AIC value is not changing much), then the component returns, else the component loops to block 401 to select the next combination of the numbers of coefficients.

Figure 5:
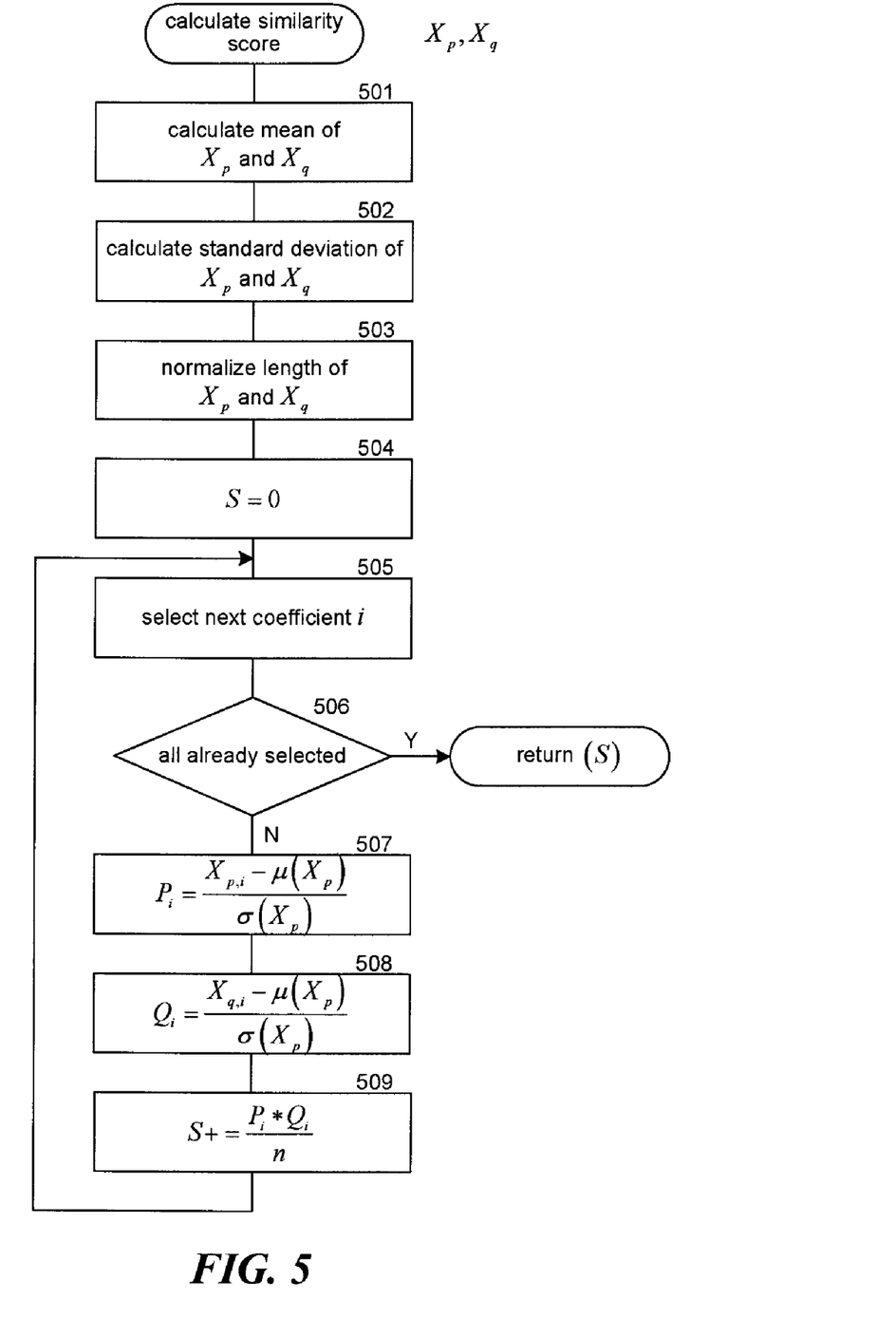
FIG. 5 is a flow diagram that illustrates the processing of a calculate similarity score component of the query analysis system in some embodiments.

FIG. 5 is a flow diagram that illustrates the processing of the calculate similarity score component of the query analysis system in some embodiments. The component is passed the ARIMA coefficients of a pair of queries and returns a similarity score indicating similarity of the queries based on a correlation of the ARIMA coefficients. In blocks 501-502, the component calculates the mean and the standard deviation of the ARIMA coefficients if they have not yet been calculated. In block 503, the component normalizes the number of ARIMA coefficients for the queries. In blocks 504-509, the component loops aggregating the similarity score. In block 504, the component initializes the similarity score. In block 505, the component selects the next ARIMA coefficient of the passed query. In decision block 506, if all the ARIMA coefficients have already been selected, then the component returns the aggregated similarity score, else the component continues at block 507. In block 507, the component calculates a correlation factor for one of the passed queries for the selected coefficient. In block 508, the component calculates a correlation factor for the other of the passed queries for the selected coefficient. In block 509, the component multiplies the factors and aggregates them into the similarity score. The component then loops to block 505 to select the next ARIMA coefficient.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computing device for determining similarity between queries, the method comprising:
    storing frequencies of the queries during intervals, each frequency of a query for an interval representing a number of times the query was submitted by users to a search engine;
    for each of the queries, generating autoregressive integrated moving average ("ARIMA") coefficients for that query based on the stored frequencies for that query; and
    for a pair of queries, calculating a similarity score for the queries based on a correlation between the ARIMA coefficients of the queries, the calculating including aggregating products, for each ARIMA coefficients, of a first factor of a first query of the pair and a second factor of a second query of the pair, a factor for an ARIMA coefficient of a query being a difference between the ARIMA coefficient and a mean of the ARIMA coefficients divided by a standard deviation of the ARIMA coefficients.

2. The method of claim 1 wherein the generating of ARIMA coefficients includes identifying a number of ARIMA coefficients for each query.

3. The method of claim 2 wherein the identifying of the number of ARIMA coefficients is based on an Akaike Information Criterion algorithm.

4. The method of claim 2 wherein the calculating of a similarity score normalizes the number of ARIMA coefficients for the pair of queries.

5. The method of claim 4 wherein the normalizing includes adding ARIMA coefficients with a zero value to the query with fewer ARIMA coefficients.

6. The method of claim 1 wherein the generating of the ARIMA coefficients generates the same number of coefficients for each query.

7. The method of claim 1 wherein the frequencies of the query are derived from analysis of a query log of a search engine service.

8. The method of claim 1 including predicting frequencies of a query based on frequencies of queries that are determined to be similar based on their similarity scores.

9. A computer-readable medium encoded with instructions for controlling a computing device to determine frequency of a query at an interval, by a method comprising:
    storing frequencies of the query during intervals;
    generating autoregressive integrated moving average ("ARIMA") coefficients representing the query based on the stored frequencies;
    estimating the frequency of the query at the interval based on the ARIMA coefficients for the query; and
    determining similarity between a pair of queries based on the ARIMA coefficients for the queries, the determining including aggregating products, for each ARIMA coefficient, of a first factor of a first query of the pair and a second factor of a second query of the pair, a factor for an ARIMA coefficient of a query being a difference between the ARIMA coefficient and a mean of the ARIMA coefficients divided by a standard deviation of the ARIMA coefficients.

10. The computer-readable medium of claim 9 wherein the estimated frequency is a predicted frequency for a future interval.

11. The computer-readable medium of claim 9 wherein the estimated frequency is a regenerated frequency of a past interval.

12. A computing device for representing a query comprising:
- a query frequency store having, for each of a plurality of intervals, a frequency of the query during the interval;
- a component that generates autoregressive integrated moving average ("ARIMA") coefficients for the query based on the frequencies of the query during the intervals;
- an ARIMA coefficient store for storing the generated ARIMA coefficients representing the query; and
- a component that determines similarity between a pair of queries based on the ARIMA coefficients of the queries, the determining including aggregating products, for each ARIMA coefficient, of a first of a first query of the pair and a second factor of a second query of the pair, a factor for an ARIMA coefficient of a query being a difference between the ARIMA coefficient and a mean of the ARIMA coefficients divided by a standard deviation of the ARIMA coefficients.

13. The computing device of claim 12 wherein the similarity is based on a similarity score derived from a correlation of the ARIMA coefficients of the queries.

* * * * *

UNITED STATES PATENT AND TRADEMARK OFFICE
CERTIFICATE OF CORRECTION

| | | |
|---|---|---|
| PATENT NO. | : 8,090,709 B2 | Page 1 of 1 |
| APPLICATION NO. | : 11/770307 | |
| DATED | : January 3, 2012 | |
| INVENTOR(S) | : Ning Liu et al. | |

It is certified that error appears in the above-identified patent and that said Letters Patent is hereby corrected as shown below:

In column 10, line 2, in Claim 12, delete "of a first of a first" and insert -- of a first factor of a first --, therefor.

Signed and Sealed this
Twenty-eighth Day of February, 2012

David J. Kappos
*Director of the United States Patent and Trademark Office*